United States Patent
Petculescu et al.

(10) Patent No.: US 9,916,357 B2
(45) Date of Patent: Mar. 13, 2018

(54) RULE-BASED JOINING OF FOREIGN TO PRIMARY KEY

(71) Applicant: Microsoft Technology Licensing, LLC, Redmond, WA (US)

(72) Inventors: Cristian Petculescu, Seattle, WA (US); Marius Dumitru, Sammamish, WA (US); Vasile Paraschiv, Redmond, WA (US); Amir Netz, Bellevue, WA (US); Paul Jonathon Sanders, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 651 days.

(21) Appl. No.: 14/317,056

(22) Filed: Jun. 27, 2014

(65) Prior Publication Data
US 2015/0379085 A1 Dec. 31, 2015

(51) Int. Cl.
*G06F 17/30* (2006.01)

(52) U.S. Cl.
CPC .. *G06F 17/30498* (2013.01); *G06F 17/30303* (2013.01); *G06F 17/30339* (2013.01); *G06F 17/30466* (2013.01); *G06F 17/30595* (2013.01)

(58) Field of Classification Search
CPC ........ G06F 17/30336; G06F 17/30339; G06F 17/30371; G06F 17/30581
See application file for complete search history.

(56) References Cited

U.S. PATENT DOCUMENTS

| | | | |
|---|---|---|---|
| 5,404,507 | A | 4/1995 | Bohm et al. |
| 5,615,367 | A | 3/1997 | Bennett et al. |
| 6,339,777 | B1 | 1/2002 | Attaluri et al. |
| 6,360,223 | B1 | 3/2002 | Ng et al. |
| 6,980,976 | B2 | 12/2005 | Alpha et al. |
| 7,383,273 | B2 | 6/2008 | Wang et al. |
| 7,725,471 | B2 | 5/2010 | Weinberg et al. |
| 7,730,097 | B2 | 6/2010 | Oswalt |
| 8,086,592 | B2 | 12/2011 | Mion et al. |

(Continued)

FOREIGN PATENT DOCUMENTS

WO    WO 2001008045    2/2001

OTHER PUBLICATIONS

U.S. Appl. No. 14/614,299, filed Feb. 4, 2015, Petculescu et al.
(Continued)

*Primary Examiner* — Dinku Gebresenbet
(74) *Attorney, Agent, or Firm* — Workman Nydegger (57) ABSTRACT

Linking of a child table to a parent table in a database system. For a given parent table row, an expression associated with the particular row is identified. The expression may be a semantic expression that comprises something different than or more than an equals expression or a contains expression. The expression might also take as input a field of the parent table other than the primary key of the parent table. For each of multiple (and potentially all) rows of a child table, the expression is evaluated against a foreign key of the corresponding row of the child table. If the foreign key matches the expression, an association is created, and perhaps saved, between the foreign key and the particular row of the parent table. The expressions may differ even down to the granularity of a single row in the parent table, thereby enabling perhaps custom per-row expressions.

19 Claims, 6 Drawing Sheets

(56) References Cited

U.S. PATENT DOCUMENTS

| | | | |
|---|---|---|---|
| 8,108,367 B2 | 1/2012 | Konik et al. | |
| 8,407,180 B1 | 3/2013 | Ramesh et al. | |
| 8,442,999 B2 | 5/2013 | Gorelik et al. | |
| 2002/0194149 A1* | 12/2002 | Gerber | G06F 17/30595 707/999.001 |
| 2004/0186826 A1 | 9/2004 | Choi et al. | |
| 2005/0251526 A1 | 11/2005 | Nayak | |
| 2005/0283485 A1 | 12/2005 | Blaicher et al. | |
| 2005/0283501 A1 | 12/2005 | Blaicher et al. | |
| 2006/0248087 A1 | 11/2006 | Agrawal et al. | |
| 2006/0288024 A1 | 12/2006 | Braica | |
| 2007/0174329 A1 | 7/2007 | Anderson et al. | |
| 2007/0250471 A1 | 10/2007 | Fontoura et al. | |
| 2009/0125530 A1 | 5/2009 | Martinsson et al. | |
| 2009/0144295 A1* | 6/2009 | Mion | G06F 17/30 707/999.1 |
| 2009/0198729 A1 | 8/2009 | Gong | |
| 2010/0131570 A1* | 5/2010 | Weinberg | G06F 17/30607 707/803 |
| 2012/0078950 A1 | 3/2012 | Conrad et al. | |
| 2012/0117067 A1* | 5/2012 | Yakubovich | G06F 17/30327 707/737 |
| 2012/0246133 A1 | 9/2012 | Hsu et al. | |
| 2014/0089255 A1 | 3/2014 | Pejathaya et al. | |
| 2014/0172905 A1 | 6/2014 | Konik et al. | |
| 2014/0195542 A1 | 7/2014 | Larson et al. | |
| 2016/0062997 A1 | 3/2016 | Roussey | |
| 2016/0224602 A1 | 8/2016 | Petculescu et al. | |
| 2016/0224604 A1 | 8/2016 | Petculescu et al. | |

OTHER PUBLICATIONS

U.S. Appl. No. 14/610,963, filed Jan. 30, 2015, Petculescu et al.

Chan, et al., "Efficient Filtering of XML Documents with Xpath Expression", In 18th international Conference on Data Engineering, Feb. 26, 2002, 10 pages.

Sadoghi, et al., "Analysis and Optimization for Boolean Expression Indexing", In Journal of ACM Transactions on Database Systems, vol. 38, Issue 2, Jun. 2013, 45 pages.

Ramabhadran, et al., "Prefix Hash Tree an Indexing Data Structure over Distributed Hash Tables", In Proceedings of the 23rd ACM Symposium on Principles of Distributed Computing, Jul. 2004, 10 pages.

Li, et al., "Dbease: Making Databases User friendly and Easily Accessible", In 5th Biennial Conference on Innovative Data Systems Research, Jan. 9, 2011, 12 pages.

Li, et al., "DiHO: A Distributed Higher-Order Association Rule Miner", In Proceedings of the 24th ACM SIGMOD International Conference on Management of Data, Jul. 13, 2005, 9 pages.

"Full-Text Search (SQL Server)" Retrieved on: Nov. 24, 2014. Available at <<http://msdn.microsoft.com/en-us/library/ms142571.aspx>>.

"Intersystems Cache Technology Guide", Published on: Jul. 4, 2014. Available at <<http://intersystems.com/assets/CacheTechnologyGuide.pdf>>.

"International Search Report and Written Opinion Issued in PCT Application No. PCT/US2016/016032" dated Apr. 29, 2016, 10 Pages.

"Second Written Opinion Issued in PCT Application No. PCT/US2015/037300", dated May 31, 2016, 7 Pages.

"International Preliminary Report on Patentability Issued in PCT Application No. PCT/US2015/037300", dated Sep. 28, 2016, 8 Pages.

"InterSystems Cache Technology Guide", Published on: Aug. 18, 2012, Available at: http://www.intersystems.com/cache/technology/techguide/cache_tech-guide_02.html.

Zobe, et al., "AN Efficient Indexing Technique for Full-Text Darabase Systems", In Proceedings of the 18th International Conference on Very Large Data Bases, Aug. 23, 1992, 11 pages.

Davis, et al., "Alias: A Nested Relational Database System for Text Applications", In IEEE Transactions on Knowledge and Data Engineering, vol. 7, Issue 3, Jun. 1995, 17 pages.

"Textual Searches on Database Data Using Microsoft SQL Server 7.0", Published on: Jan. 1999, Available at: http://msdn.microsoft.com/en-us/library/aa226176(v=sql.70).aspx.

"SQL Server Full Text Search", Published on: Apr. 22, 2012, Available at: http://msdn.microsoft.com/en-us/library/ms142571.aspx.

"International Search Report and Written Opinion issued in PCT Application No. PCT/US2015/037300", dated Oct. 29, 2015, 10 pages.

"International Preliminary Report on Patentability Issued in PCT Application No. PCT/US2016/016032", dated May 3, 2017, 6 Pages.

"Second Written Opinion Issued in PCT Application No. PCT/US2016/016032", dated Jan. 20, 2017, 5 Pages.

Office Action dated Jun. 13, 2017 cited in U.S. Appl. No. 14/614,299.

Office Action dated Jul. 13, 2017 cited in U.S. Appl. No. 14/610,963.

Notice of Allowance dated Oct. 6, 2017 cited in U.S. Appl. No. 14/614,299.

* cited by examiner

RULE-BASED JOINING OF FOREIGN TO PRIMARY KEY

BACKGROUND

Computing systems and associated networks have revolutionized the way human beings work, play, and communicate. Nearly every aspect of our lives is affected in some way by computing systems. Computing systems are now largely connected to networks and the Internet so as to enable widespread communications. Database technologies are enabled through the user of computing systems. In relational database systems, there are multiple interrelated tables, where the relationships are defined by links between tables.

Often tables are linked such that a field in one table (called the "referencing table" or the "child table") uniquely identifies a row (e.g., a primary key) of another table (called the "referenced table" or the "parent table"). Thus, the foreign key is used to establish and enforce a link between the child and parent tables.

Conventionally, the foreign key of the child table uniquely identifies the row of the parent table through direct equality in which the foreign key is exactly the same as the parent key. In the case of the foreign and primary keys both being text, the foreign key of the child table might also uniquely identify the row of the parent table by containing the text of the primary key of that row. Accordingly, the foreign key of the child table uniquely identifies a row of the parent table by being the same as (or containing in the case of text) the primary key of that row.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the linking of a child table to a parent table in a database system using a foreign key in the child table. For a given row of a parent table, an expression associated with the particular row is identified. In one embodiment, the expression is a semantic expression that comprises something different than or more than just an equals expression or a contains expression. For instance, the expression might be a compound expression, a ranged expression, a set expression, and so forth, representing a more complex relationship. The expression might also take as input a field of the parent table other than the primary key of the parent table.

For each of multiple (and potentially all) rows of a child table, the expression is evaluated against a foreign key of the corresponding row of the child table. If the foreign key of the corresponding row of the child table matches the expression based on the act of evaluating, an association is created between the foreign key and the particular row of the parent table, and that association may perhaps be persisted, for instance, for later use in response to a query.

The expression might be applicable to all rows of the parent table to thereby similarly create associations between foreign keys of the child table and the corresponding matching rows of the parent table. However, in some embodiments, the expressions may differ even down to the granularity of a single row in the parent table, thereby enabling perhaps custom per-row expressions that define one or more association criteria. In that case, perhaps there is a dedicated column in the parent table for such expressions.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the linking of a child table to a parent table in a database system using a foreign key in the child table. For a given row of a parent table, an expression associated with the particular row is identified. In one embodiment, the expression is a semantic expression that comprises something different than or more than just an equals expression or a contains expression. For instance, the expression might be a compound expression, a ranged expression, a set expression, and so forth, representing a more complex relationship. The expression might also take as input a field of the parent table other than the primary key of the parent table.

For each of multiple (and potentially all) rows of a child table, the expression is evaluated against a foreign key of the corresponding row of the child table. If the foreign key of the corresponding row of the child table matches the expression based on the act of evaluating, an association is created between the foreign key and the particular row of the parent table, and that association may perhaps be persisted, for instance, for later use in response to a query.

The expression might be applicable to all rows of the parent table to thereby similarly create associations between foreign keys of the child table and the corresponding matching rows of the parent table. However, in some embodiments, the expressions may differ even down to the granularity of a single row in the parent table, thereby enabling perhaps custom per-row expressions that define one or more association criteria. In that case, perhaps there is a dedicated column in the parent table for such expressions.

Some introductory discussion of a computing system will be described with respect to FIG. 1. Then, embodiments of such expression based associating will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
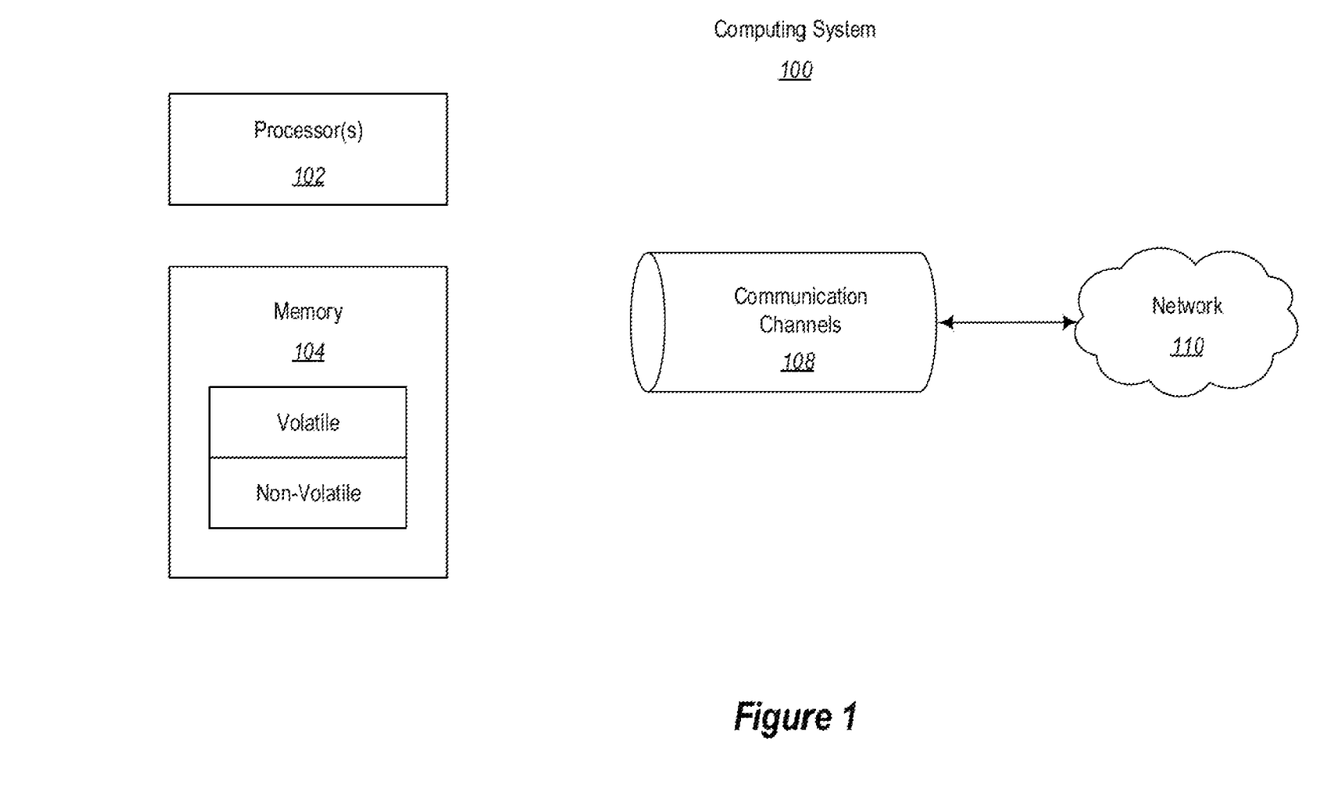
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
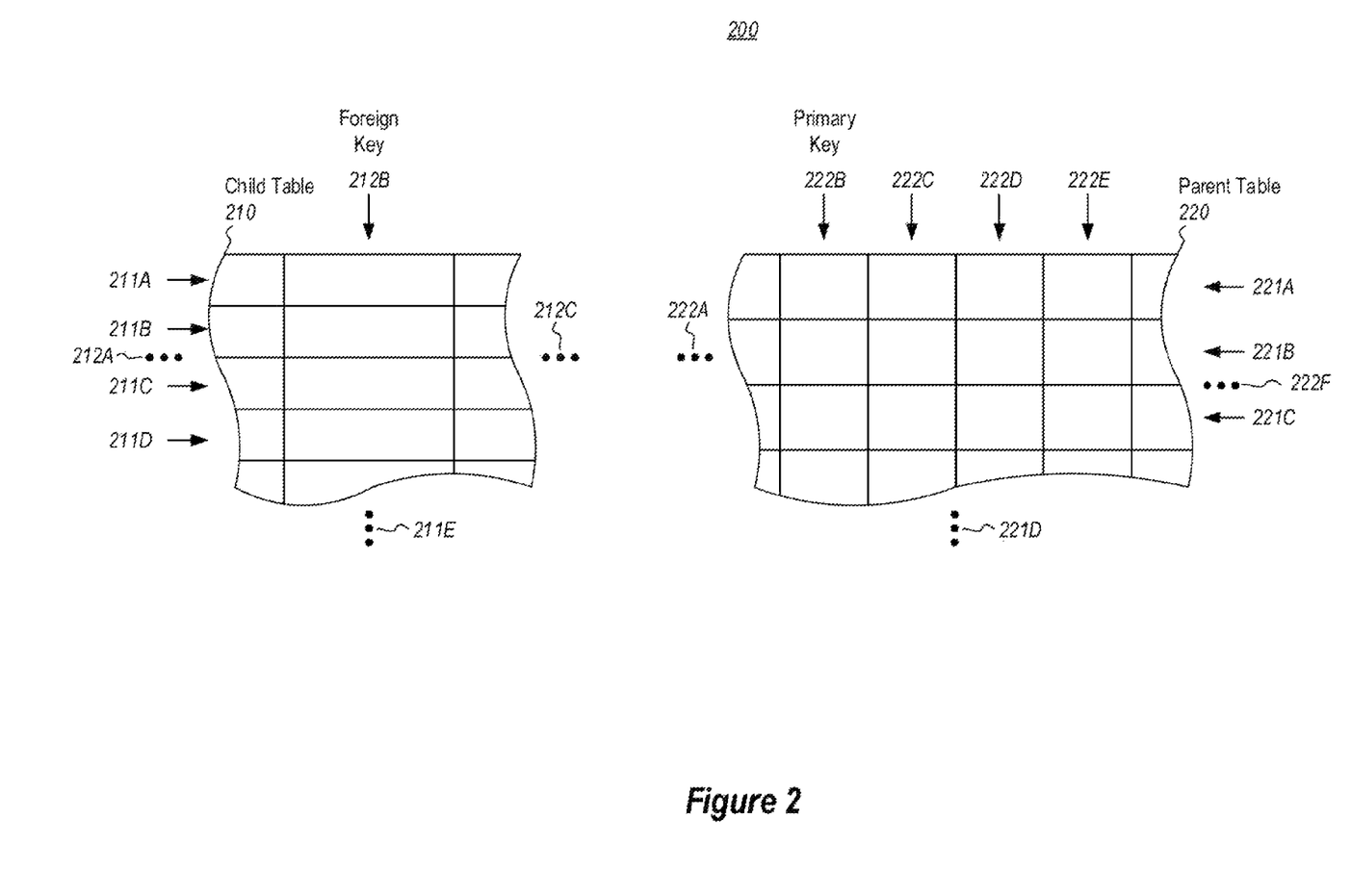
FIG. 2 illustrates a database system in which the principles described herein may operate, and which includes a child table and a parent table.

FIG. 2 illustrates a database system 200 in which the principles described herein may operate. The database environment 200 includes a child table 210 and a parent table 220. The principles described herein may operate upon any configuration of child table and any configuration of parent table regardless of the number of rows and columns in each.

For example purposes only, the child table 210 is illustrated as including four rows 211A, 211B, 211C and 211D. However, the ellipses 211E represent that the child table 210 may include any number of rows, even fewer than the four illustrated. For instance, the child table 210 may include as little as a single row, and as many as an enumerable number of rows, and anything in-between. Similarly, the child table 210 is illustrated as including a single column 212B, although the ellipses 212A and 212C represent that the child table 210 may include any number of columns. The column 212B is a foreign key column that includes values (not illustrated concretely) that may be used to uniquely identify a corresponding row in the parent table 220.

For example purposes only, the parent table 220 is illustrated as including three rows 221A, 221B and 221C. However, the ellipses 221D represent that the parent table 220 may include any number of rows, even fewer than the three illustrated. For instance, the parent table 220 may include as little as a single row, and as many as an enumerable number of rows, and anything in-between. Similarly, the parent table 220 is illustrated as including four columns 222B, 222C, 222D and 222E, although the ellipses 222A and 222F represent that the parent table 220 may include any number of columns. The column 222B is a primary key column that includes values (not illustrated concretely in FIG. 2) that may be used to uniquely identify a corresponding row in the parent table 220. Although FIG. 2 is illustrated in abstract form, with no values illustrated, more concrete examples will be described below with respect to FIGS. 4 and 5.

In this description and in the claims, the terms "row" and "column" are used. The term "row" is not restricted to an element that is stacked vertically, and extended horizontally. Furthermore, the term "column" is not restricted to an element that is stacked horizontally, and extended vertically. The manner in which a table is displayed is not important to the principles of the present invention as described herein. The tables described herein are not necessarily tables that are illustrated in a user interface, by a computer-readable form. Accordingly, the terms horizontal and vertical have little meaning in such computer-readable tables. Thus, the terms "rows" and "columns" described herein are merely referring to two district dimensions of a computer representation of the table.

Figure 3:
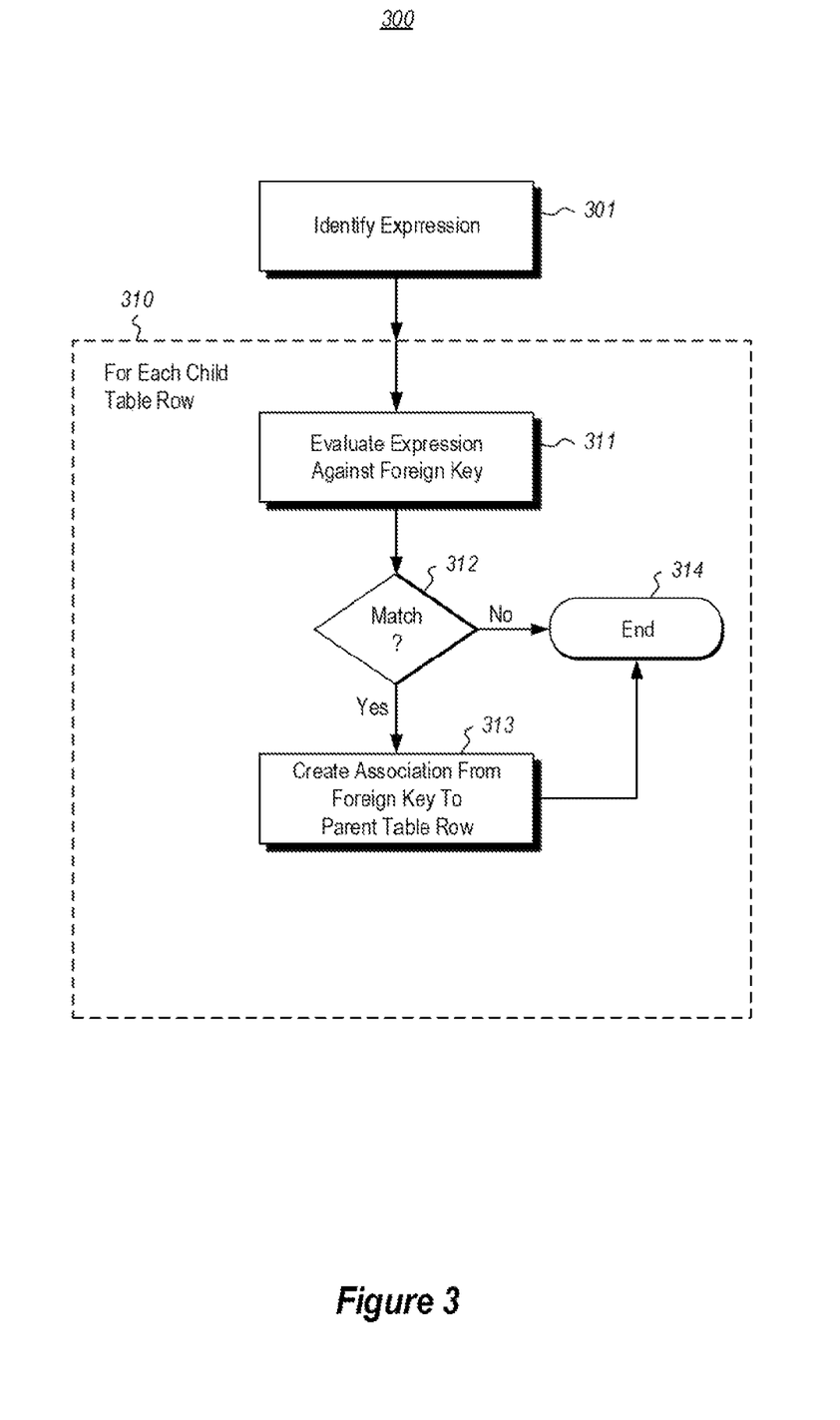
FIG. 3 illustrates a flowchart of a method for linking a child table to a parent table in a database system using a foreign key field in the child table.

In accordance with the principles described herein, associations are made between at each of least some of the foreign keys in the foreign key column 212B of the child table 210 and corresponding sets of one or more rows in parent table 220. In such a manner, the principles described herein link the child table 210 to a parent table 220. Accordingly, FIG. 3 illustrates a flowchart of a method 300 for linking a child table to a parent table in a database system using a foreign key field in the child table. As the method 300 may be performed within the database system 200 of FIG. 2, the method 300 will now be described with frequent reference to FIG. 2. The method 300 may be performed by, for instance, a computing system (such as computing system 100) by one or more processors of the computing system (e.g., processors 102) executing one or more computer-executable instructions.

The method 300 may be repeated for each row in the parent table. In fact, as described further below, the method 300 may be performed substantially concurrently for all rows in the parent table. Such might be accomplished using a trie structured. For each row in the parent table, the method 300 involves identifying an expression (act 301). The expression is used for each row in the child table to determine whether the child table row is to be associated with the row that corresponds to the expression in the parent table. To make the determination for each child table row with respect to a given parent table row, the expression takes as input the foreign key of the child table row one or more fields of the parent table row.

For instance, in the context of FIG. 2, the expression associated with the parent table row 221A is identified, and the foreign key of the child table row 211A and one or more values of the parent table row 221A would be provided as input to the expression to evaluation whether there is a match. Similarly, the foreign key of the child table row 211B and one or more values of the parent table row 221A would be provided as input to the expression to evaluate whether there is a match. Also, the foreign key of the child table row 211C and one or more values of the parent table row 221A would be provided as input to the expression to evaluate whether there is a match. Finally, at least with respect to the parent table row 221A and the illustrated child table rows 211A through 211D, the foreign key of the child table row 211D and one or more values of the parent table row 221A would be provided as input to the expression to evaluate whether there is a match.

Similarly, each of the child table rows 211A through 211D would be evaluated against the expression for the parent table row 211B perhaps at the same time as the child table rows 211A through 211D would be evaluated against the expression for parent table row 211A. Also, each of the child table rows 211A through 211D would be evaluated against the expression for the parent table row 211C perhaps at the same time as the child table rows 221A through 211D would be evaluated against the expressions for parent table rows 221A and 221B.

Conventionally, expressions defining an association between a foreign key and a parent table row are simply based on an equality to the primary key, and is the same for all rows in the parent table. For instance, if the foreign key for a given child table row is the same as the primary key for any of the parent table rows, then an association would be made between the foreign key of the child table row and the matching parent table row. In the case of text, the expression may be a "contains" expression. That is, if the foreign key (in the form of text) for a given child table row contains the text of the primary key for any of the parent table row, then an association would be made between the foreign key of the child table row and the matching parent table row.

In contrast, in accordance with the principles described herein, an expression may be any expression, including semantic expressions, and can use values from the parent table row other than the primary key. Furthermore, while not required, the expression may differ by parent table row. Accordingly, row based expressions of association criteria are enabled herein. In this description and in the claims, a "semantic expression" is an expression that semantically describes one or more association criteria, and an equals or contains criteria expressly falls outside of the definition of "semantic expression".

Figure 4:
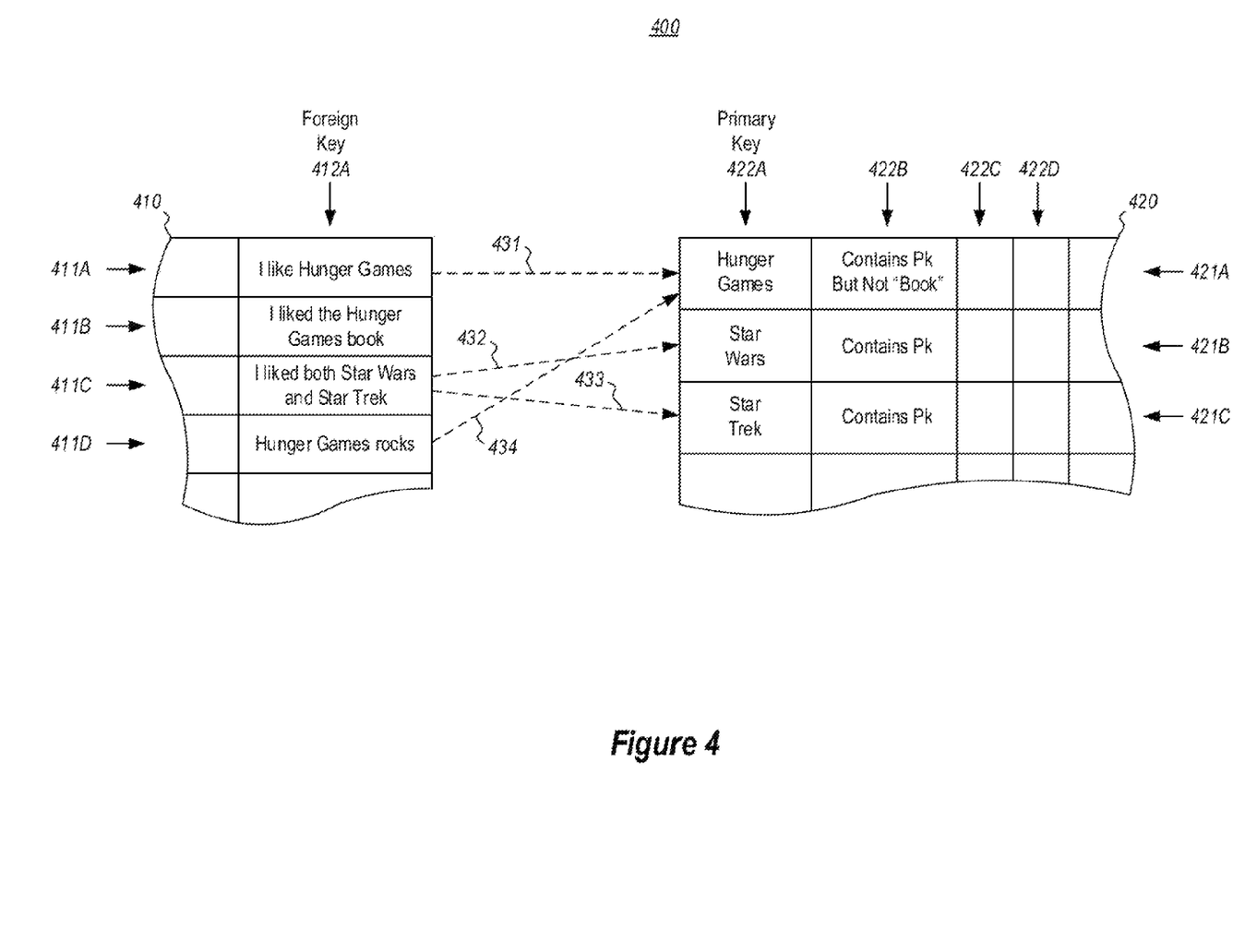
FIG. 4 illustrates an example database system in which there is a tweet child table and a movies parent table.

For instance, as an example, a semantic expression includes a component expression, a ranged expression, a set expression, or the like. For instance, FIG. 4 illustrates an example database system 400 in which there is a tweet child table 410 and a movies parent table 420. The tweet child table 410 includes a foreign key column 412A that lists various tweets made. The movie parent table 420 includes a primary key column 422A that lists various movies. In this case, the expression for each parent table row is identified included within (and identified by referencing) the expressions column 422B. The expression for parent table row 421A (i.e., contains [Primary Key] but not "Book") is a compound semantic expression, and is different than the expressions of the remaining parent table rows 421B and 421C (which is contains [Primary Key]).

The method 300 of FIG. 3 will now be described with respect to the example database system 400 of FIG. 4. The content of dashed-lined box 310 may be performed for each child table row. Accordingly, the contents of dashed-lined box 310 are performed for the tweet "I like Hunger Games" in child table row 411A. The tweet "I like Hunger Games" is then evaluated against the expression "Contains 'Hunger Games', but not 'book'". It is match ("Yes" in decision block 312), and thus an association 431 is made (act 313) between the foreign key "I like Hunger Games" and the parent table row 421A that contains the movie primary key "Hunger Games". This is because the tweet "I like Hunger Games" contains the term "Hunger Games" (the primary key), but does not contain the term "Book", and is thus a match to the expression in the expression field 422B of the corresponding parent table row 421A.

The contents of dashed-lined box 310 are also performed for the tweet "I liked the Hunger Games book" in child table row 411B. The tweet "I liked the Hunger Games book" is then evaluated against the expression "Contains 'Hunger Games', but not 'book'". It is not a match ("No" in decision block 312) because the tweet contains the term "book". Accordingly, no further evaluation (act 314) of the child table row 411B need be performed with respect to the parent table row 421A.

The contents of dashed-lined box 310 are also performed for the tweet "I liked both Star Wars and Star Trek" in child table row 411C, which is evaluated against the expression "Contains 'Hunger Games', but not 'Book'". It is not a match ("No" in decision block 312). Accordingly, no further evaluation (act 314) of the child table row 411C need be performed with respect to the parent table row 421A.

The contents of dashed-lined box 310 are also performed for the tweet "Hunger Games rocks" in child table row 411D, which is evaluated against the expression "Contains 'Hunger Games', but not 'Book'". It is a match ("Yes" in decision block 312), and thus an association 434 is made (act 313) between the foreign key "Hunger Games rocks" and the parent table row 421A. This is because the tweet "I like Hunger Games" contains the term "Hunger Games" (the primary key), but does not contain the term "Book", and is thus a match to the expression in the expression field 422B of the corresponding primary row field 421A.

The method 300 is also performed with respect to the parent table row 421B is a similar manner. The contents of dashed-lined box 310 are thus performed for the tweet "I like Hunger Games" in child table row 411A. The tweet "I like Hunger Games" is evaluated against the expression "Contains 'Star Wars'" (act 311). It is not a match ("No" in decision block 312).

The tweet "I liked the Hunger Games book" is then evaluated against the expression "Contains 'Star Wars'" (act 311). It is also not a match ("No" in decision block 312), and thus no association is made.

The tweet "I like both Star Wars and Star Trek" is then evaluated against the expression "Contains 'Star Wars'" (act 311). It is a match ("Yes" in decision block 312). Accordingly, association 432 is made (act 313) between the tweet "I liked both Star Wars and Star Trek" and the parent table row 421B that has the movie primary key "Star Wars".

The tweet "Hunger Games rocks" is then evaluated against the expression "Contains 'Star Wars'" (act 311). It is not a match ("No" in decision block 312), and thus no association is made.

The method 300 is also performed with respect to the parent table row 421C is a similar manner. The contents of dashed-lined box 310 are thus performed for the tweet "I like Hunger Games" in child table row 411A. The tweet "I like Hunger Games" is evaluated against the expression "Contains 'Star Trek;" (act 311). It is not a match ("No" in decision block 312).

The tweet "I liked the Hunger Games book" is then evaluated against the expression "Contains 'Star Trek'" (act 311). It is also not a match ("No" in decision block 312), and thus no association is made.

The tweet "I like both Star Wars and Star Trek" is then evaluated against the expression "Contains 'Star Trek'" (act 311). It is a match ("Yes" in decision block 312). Accordingly, association 433 is made (act 313) between the tweet "I liked both Star Wars and Star Trek" and the parent table row 421B that has the movie primary key "Star Wars".

Figure 5:
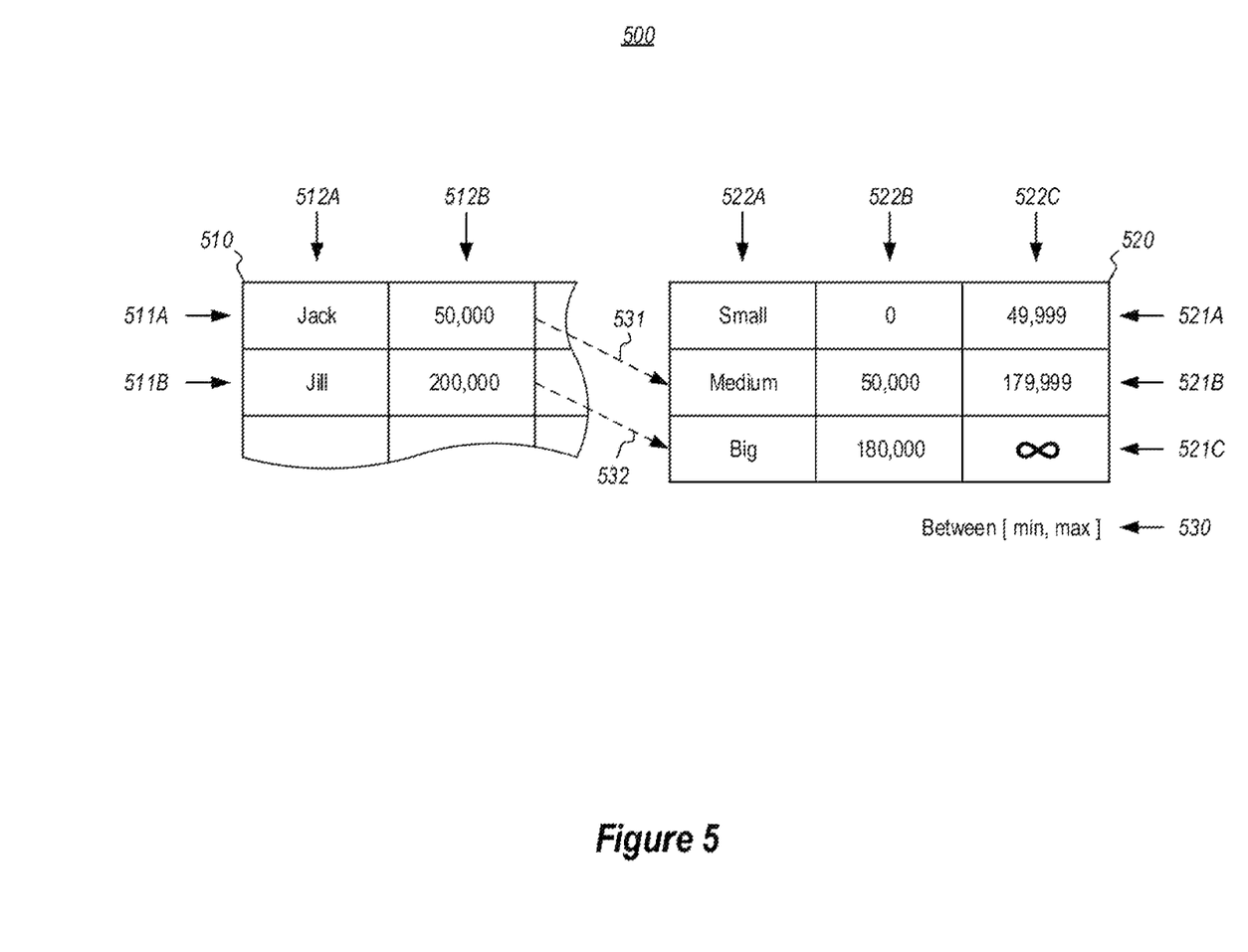
FIG. 5 illustrates an example database system in which there is an employee child table and a salary range parent table.

A second example is illustrated in FIG. 5, which illustrates an example database system 500 in which there is an employee child table 510 and a salary range parent table 520. In the child table 510, there is a name column 512A and a salary column 512B. The salary column 512 serves as the primary key column. In this case, the expression 530 for each parent table row is the same, but is a complex expression, and uses fields other than the primary key field as an input to the expression. In particular, the expression 530 indicates that if the foreign key is between the value in the minimum column 522B and the maximum column 522C for the respective parent table row, then the foreign key will be associated with the corresponding parent table row.

The method 300 of FIG. 3 will now be described with respect to the example database system 500 of FIG. 5. The method 300 is performed with respect to the parent table row 521A having the primary key Small. The content of dashed-lined box 310 may be performed for each of child table row 511A and 511B. In each case, however, the salary is not within 0 and 49,000 ("No" in decision block 312), and thus there are no associations made in this performance of method 300.

The method 300 is also performed with respect to the parent table row 521B having the primary key Medium. Here the foreign key 50,000 for child table row 511A matches (it is between 50,000 and 179,999, inclusive) ("Yes" in decision block 312), and thus association 531 is made between the foreign key 50,000 of child table row 511A and the parent table row 521B. As for child table row 511B, the value 200,000 is not between 50,000 and 179,999 ("No" in decision block 312), and thus no association is made (act 314).

The method 300 is also performed with respect to the parent table row 521C having the primary key High. Here the foreign key 50,000 for child table row 511A is not 180,000 or greater ("No" in decision block 312), and thus no association is made (act 314). However, the foreign key 200,000 for child table row 511B is greater than 180,000 ("Yes" in decision block 312), and thus association 532 is made between the foreign key 200,000 of child table row 511B and the parent table row 521C. In this case, the expression was a ranged expression. A set expression is a case in which the foreign key is evaluated to determine if it is one of a number of values.

Figure 6:
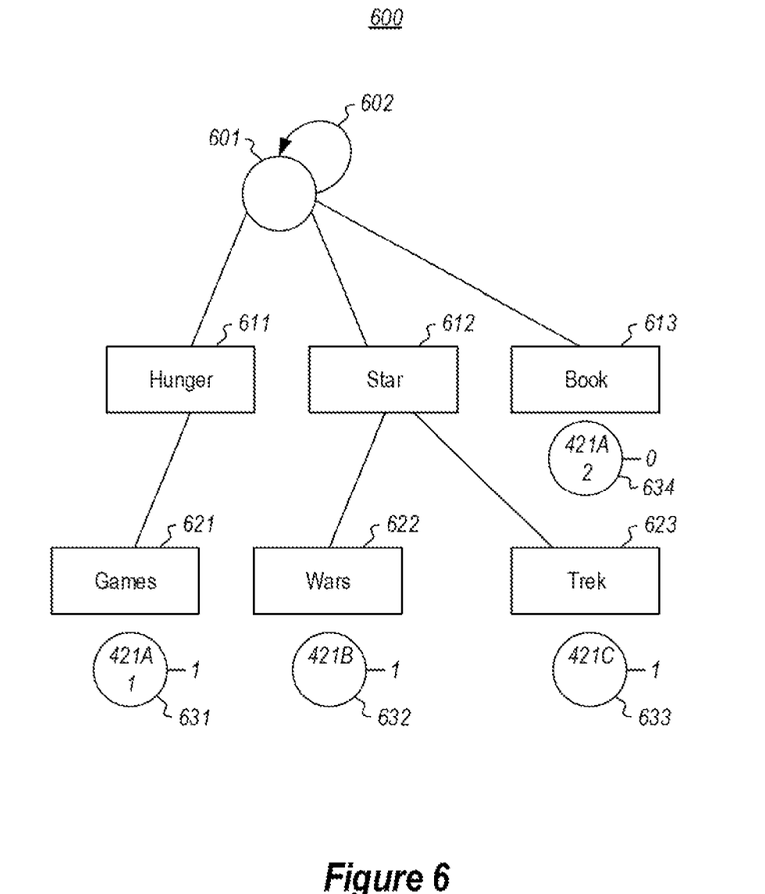
FIG. 6 illustrates a trie structure that is built based on the primary keys (e.g., the movie titles) of the movie primary table of FIG. 4.

As previously mentioned, the method 300 may be concurrently performed for each parent table row through the use of a trie structure, even if the expressions may differ from one parent table row to the next. The primary key of the parent table is used to construct a trie structure. For instance, FIG. 6 illustrates a trie structure 600 that is built based on the primary keys (e.g., the movie titles) of the movie primary table 420 of FIG. 4. The trie table is navigated for each foreign key and to the extent a terminating leaf is encountered, the associated expression or expression component (e.g., nodes 631 through 634) is likewise determined to be a match. In the case of a nullifying node (expression component node 634, denoted by a rightward facing zero), the matching to that expression or expression component means that the expression itself or the expression for which the expression component is a component, cannot be met on this evaluation of the trie structure 600. The case of an affirming node (e.g., nodes 631 through 633, denoted by a rightward facing one), the matching to the expression means that the expression is satisfied, or in the case of an expression component, means that expression component is satisfied.

For instance, navigation of the trie structure 600 based on the tweet foreign key "I like Hunger Games" will now be described. Navigation begins at node 601. Navigation to the next level of the hierarchy happens upon encountering the text of the next node. For instance, "I" does not match any text of nodes 611, 612 or 613, and so the navigation remains (as represented by line 602) at the parent node 601. "like" is then evaluated, and again there are no matches to the text of nodes 611, 612 or 613. Thus, navigation remains at the parent node 601. "Hunger" matches the text for the next node 611, and thus navigation moves to node 611. "Games" matches the text for the next hierarchical node 621, and thus navigation moves to the terminating node 621, which is associated with the first component expression 631 of the compound expression within parent table row 421A. Accordingly, the affirming node for row 421A is encountered. The foreign key has now been evaluated without encountering the nullifying expression 634 for parent table row 421. Accordingly, the association 431 can be made.

Navigation of the trie structure 600 based on the tweet foreign key "I liked the Hunger Games book" will now be described. Navigation begins at node 601. "I" does not match any text of nodes 611, 612 or 613, and so the navigation remains (as represented by line 602) at the parent node 601. "liked" is then evaluated, and again there are no matches to the text of nodes 611, 612 or 613. Thus, navigation remains at the parent node 601. "the" is then evaluated, and again there are no matches, and navigation remains at parent node 601. "Hunger" matches the text for the next node 611, and thus navigation moves to node 611. "Games" matches the text for the next hierarchical node 621, and thus navigation moves to the terminating node 621, which is associated with the first component expression 631 of the compound expression within parent table row 421A. Upon reaching a terminating node, navigation returns to parent node 601. "book" matches the text of the next hierarchical node 613. Accordingly, the nullifying node for row 421A is encountered. Accordingly, no association can be made as the reaching of any nullifying node (e.g., node 634) with respect to a compound expression negates any affirming node (e.g., node 631) with respect to the compound expression.

Navigation of the trie structure 600 based on the tweet foreign key "I liked both Star Wars and Star Trek" will now be described. Navigation begins at node 601. "I" does not match any text of nodes 611, 612 or 613, and the navigation remains at the parent node 601. "liked" is then evaluated, and again there are no matches to the text of nodes 611, 612 or 613, and thus navigation remains at the parent node 601. "both" is then evaluated, and again there are no matches, and navigation remains at parent node 601. "Star" matches the text for the next node 612, and thus navigation moves to node 612. "Wars" matches the text for the next hierarchical node 622, and thus navigation moves to the terminating node 632, which is an affirming node 632 for the expression in parent table row 421B. There are no nullifying nodes for parent table row 421B. Accordingly, the association 432 can be made.

Navigation returns to parent node 601. "and" is then evaluated, and again there are no matches to the text of nodes 611, 612 or 613, and thus navigation remains at the parent node 601. Star" matches the text for the next node 612, and thus navigation moves to node 612. "Trek" matches the text for the next hierarchical node 623, and thus navigation moves to the terminating node 633, which is an affirming node 633 for the expression in parent table row 421C. There are no nullifying nodes for parent table row 421C. Accordingly, the association 432 can be made.

Navigation of the trie structure 600 based on the tweet foreign key "Hunger Games rocks" will now be described. Navigation begins at node 601. "Hunger" matches the text for the next node 611, and thus navigation moves to node 611. "Games" matches the text for the next hierarchical node 621, and thus navigation moves to the terminating node 621, which is associated with the first component expression 631 of the compound expression within parent table row 421A. Accordingly, the affirming node for row 421A is encountered. Navigation returns to parent node 601 after reaching a terminating node. "rocks" is then evaluated, and again there are no matches to the text of nodes 611, 612 or 613, and thus navigation remains at the parent node 601. Accordingly, the affirming node 631 for the expression in parent table row 421A is encountered without reaching the nullifying node 634 for the expression in the parent table row 421A. Accordingly, the association 431 can be made.

Accordingly, the principles described herein may be performed to automatically associate foreign keys of child table rows in a database with parent table rows in the database. The principles described herein allow for complex expressions defining one or more prerequisites for making the association. Furthermore, expressions may be customized at even the per-row level, and may use input value other than the primary key from the parent table row. Thus, a flexible and automated mechanism for creating associations between a child table and a parent table has been described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having thereon computer-executable instructions that are structured such that, when executed by one or more processors of a computing system, the computer-executable instructions cause the computing system to link a child table to a parent table in a database system, by performing at least the following:
   identifying a semantic expression associated with a row of a parent table, the semantic expression at least:
      being stored as a first key in the row of the parent table;
      describing a semantic relationship using association criteria;

referencing a second key from the row of the parent table; and
receiving as input a foreign key from the child table;
for each row of a plurality of rows of a child table, performing the following:
evaluating the semantic expression against the foreign key of a child table row for satisfaction of the semantic expression, wherein satisfaction of the semantic expression occurs when the foreign key of the child table satisfies the semantic expression, rather than by direct equality to the semantic expression; and
based at least on the foreign key of the row satisfying the semantic expression, creating an association between the foreign key and the row of the parent table.

2. The computer program product in accordance with claim 1, the one or more semantic relationships comprising a compound expression.

3. The computer program product in accordance with claim 1, the one or more semantic relationships comprising a ranged expression.

4. The computer program product in accordance with claim 1, the one or more semantic relationships comprising a set expression.

5. The computer program product in accordance with claim 1, the semantic expression using, as an input, a field of the particular row other than the primary key of the particular row.

6. The computer program product in accordance with claim 1, the semantic expression being a first expression, the particular row of the parent table being a first row of the parent table, the primary key of the first row being a first primary key, the method further comprising:
identifying a second expression associated with a second row of a parent table;
for each of a plurality of rows of a child table, performing the following:
evaluating the second expression against a foreign key of the corresponding row of the child table for satisfaction of the second expression; and
based at least on the foreign key of the corresponding row of the child table satisfying the second expression, creating an association between the foreign key and the second row of the parent table.

7. The computer program product in accordance with claim 6, the second expression being a same expression as the first expression.

8. The computer program product in accordance with claim 6, the second expression being a different expression than the first expression.

9. The computer program product in accordance with claim 1, wherein creating the association also comprises saving the association.

10. A method, implemented at a computer system that includes one or more processors, for linking a child table to a parent table in a database system using a foreign key in the child table, the method comprising:
identifying a semantic expression associated with a row of the parent table, the semantic at least:
being stored as a first key in the row of the parent table;
describing a semantic relationship using association criteria;
referencing a second key from the row of the parent table; and
receiving as input a foreign key from the child table;
for each row of a plurality of rows of a child table, performing the following:
evaluating the expression against a foreign key of a child table row for satisfaction of the semantic expression, wherein satisfaction of the semantic expression occurs when the foreign key of the child table satisfies the semantic expression, rather than by direct equality to the semantic expression; and
based at least on the foreign key of the row satisfying the semantic expression, creating an association between the foreign key and the row of the parent table.

11. The method in accordance with claim 10, the first expression and the second expressions being within an expression field of the parent table.

12. The method in accordance with claim 10, at least one of the first expression and the second expression taking as input a field of the parent table other than the primary key.

13. The method in accordance with claim 10, the foreign key being tokenized text.

14. The method in accordance with claim 10, the method further comprising:
formulating a trie structure using at least primary keys of the first and second row, a plurality of terminating nodes of the trie structure each corresponding to a plurality of expressions including at least the first expression and the second expression.

15. The method in accordance with claim 14, wherein evaluating the first expression, and evaluating the second expression being performed concurrently for at least one particular row of the child table by evaluating the foreign key of that particular row of the child table against the trie structure.

16. A computing system comprising:
one or more processors;
one or more computer-readable storage media having stored thereon computer-executable instructions that are structured such that, when executed by the one or more processors, the computer-executable instructions cause the computing system to link a child table to a parent table in a database system using a foreign key in the child table, the including performing at least the following:
identifying a semantic expression associated with a row of a parent table, the semantic expression at least:
being stored as a first key in the row of the parent table;
describing a semantic relationship using association criteria;
referencing a second key from the row of the parent table; and
receiving as input a foreign key from the child table;
for each row of a plurality of rows of a child table, performing the following:
evaluating the semantic expression against a foreign key of a child table row for satisfaction of the semantic expression, wherein satisfaction of the semantic expression occurs when the foreign key of the child table satisfies the semantic expression, rather than by direct equality to the semantic expression; and
based at least on the foreign key of the row satisfying the semantic expression, creating an association between the foreign key and the row of the parent table.

17. The computing system in accordance with claim 16, the field of the parent table other than the primary key being a first field of the parent table, the expression further taking as input a second field of the parent table other than the primary key.

18. The computing system in accordance with claim 16, the expression further taking as input the primary key of the parent table.

19. The computing system of claim 16, wherein based on the creation of an association between the foreign key and the row of the parent table, the computing system is configured to formulate a trie structure in an association index using at least primary keys of the first and second row, a plurality of terminating nodes of the trie structure each corresponding to a plurality of expressions including at least the first expression and the second expression.

\* \* \* \* \*

UNITED STATES PATENT AND TRADEMARK OFFICE
CERTIFICATE OF CORRECTION

PATENT NO. : 9,916,357 B2
APPLICATION NO. : 14/317056
DATED : March 13, 2018
INVENTOR(S) : Cristian Petculescu et al.

It is certified that error appears in the above-identified patent and that said Letters Patent is hereby corrected as shown below:

In the Claims

Column 10
Line 64, change "associated with a row of a parent table" to --associated with a row of the parent table--

Column 11
Line 4, change "a plurality of rows of a child table" to --a plurality of rows of the child table--
Line 61, change "the semantic at least:" to --the semantic expression at least:--

Column 12
Line 1, change "a plurality of rows of a child table" to --a plurality of rows of the child table--
Line 3, change "the expression against a foreign" to --the semantic expression against the foreign--
Line 45, change "a parent table" to --the parent table--
Line 53, change "a plurality of rows of a child table" to --a plurality of rows of the child table--
Line 55, change "against a foreign" to --against the foreign--

Signed and Sealed this
Twenty-second Day of May, 2018

Andrei Iancu
*Director of the United States Patent and Trademark Office*